US011095977B2

(12) United States Patent
Morkerken et al.

(10) Patent No.: US 11,095,977 B2
(45) Date of Patent: Aug. 17, 2021

(54) AQUATIC ACOUSTIC ENCLOSURE

(71) Applicants: SORBONNE UNIVERSITE, Paris (FR); CENTRE NATIONAL DE LA RECHERCHE SCIENTIFIQUE (CNRS), Paris (FR)

(72) Inventors: Jean-Pierre Morkerken, Thiais (FR); Jean-Dominique Polack, Paris (FR)

(73) Assignees: Jean-Dominique Polack, Thiais (FR); Jean-Pierre Morkerken, Paris (FR)

( * ) Notice: Subject to any disclaimer, the term of this patent is extended or adjusted under 35 U.S.C. 154(b) by 0 days.

(21) Appl. No.: 16/643,335

(22) PCT Filed: Aug. 31, 2018

(86) PCT No.: PCT/EP2018/073506
§ 371 (c)(1),
(2) Date: Feb. 28, 2020

(87) PCT Pub. No.: WO2019/043178
PCT Pub. Date: Mar. 7, 2019

(65) Prior Publication Data

US 2021/0067869 A1 Mar. 4, 2021

(30) Foreign Application Priority Data

Aug. 31, 2017 (FR) ...................................... 1758038

(51) Int. Cl.
*A01K 97/20* (2006.01)
*H04R 1/44* (2006.01)
*H04R 9/02* (2006.01)

(52) U.S. Cl.
CPC ............... *H04R 1/44* (2013.01); *H04R 9/022* (2013.01)

(58) Field of Classification Search
CPC .......... H04R 1/028; H04R 1/44; H04R 5/023; H04R 31/006; H04R 2420/07; A47C 15/006; A47C 7/72
See application file for complete search history.

(56) References Cited

U.S. PATENT DOCUMENTS 4,868,799 A 9/1989 Massa
5,369,796 A * 11/1994 Kung ....................... H04B 1/08 441/12

(Continued)

FOREIGN PATENT DOCUMENTS

FR 2 523 795 A1 9/1983
FR 2 586 333 A1 2/1987

(Continued)

OTHER PUBLICATIONS

International Search Report of PCT/EP2018/073506 dated Nov. 12, 2018.

*Primary Examiner* — Amir H Etesam
(74) *Attorney, Agent, or Firm* — Sughrue Mion, PLLC

(57) ABSTRACT

The present invention relates to a sound emitter device (1) that is immersible or semi-immersible in a liquid, the device comprising both a rigid hollow body (3) having at least one opening one of its ends (31, 32) and arranged to be immersed at least in part in the liquid, in such a manner that the main axis (4) passing through the opening of the hollow body (3) is substantially vertical, and also at least one electrodynamic loudspeaker (5, 51, 52) comprising at least one diaphragm (6, 61, 62), at least one magnet, at least one moving coil (7, 71, 72). The at least one loudspeaker (5, 51, 52) is fastened inside the hollow body (3) in the proximity of at least one immersed opening of the hollow body (3), the device (1) and its hollow body (3) being arranged so that, when the device (1) is at least semi-immersed, the diaphragm (6, 61, 62) of the at least one loudspeaker (5, 51, 52) is in contact with the (Continued)

liquid on at least one of its sides and closes the immersed opening (32) of the hollow body (3).

14 Claims, 6 Drawing Sheets

(56) References Cited

U.S. PATENT DOCUMENTS

| | | | | |
|---|---|---|---|---|
| 8,756,856 | B1 * | 6/2014 | Girvin | A01K 97/20<br>43/55 |
| 2016/0094911 | A1 | 3/2016 | Kropf | |
| 2017/0168176 | A1 | 6/2017 | Tenghamn | |

FOREIGN PATENT DOCUMENTS

| | | | |
|---|---|---|---|
| FR | 2 589 663 | A1 | 5/1987 |
| JP | 04-29499 | A | 1/1992 |
| JP | 2010-057040 | A | 3/2010 |

* cited by examiner

AQUATIC ACOUSTIC ENCLOSURE

CROSS REFERENCE TO RELATED APPLICATIONS

This application is a National Stage of International Application No. PCT/EP2018/073506 filed Aug. 31, 2018, claiming priority based on French Patent Application No. 1758038 filed Aug. 31, 2017.

TECHNICAL FIELD

The present invention relates to a sound emitter device that is immersible or semi-immersible in a liquid.

STATE OF THE PRIOR ART

Various undersea transducer systems, e.g. using piezoelectric crystals, exist for a variety of applications. For example, such systems may be used for broadcasting audio programs in swimming pools or for defense applications such as passive or bistatic sonars. Submersible or immersible loudspeakers are also used for keeping off certain predator fish that threaten farmed beds of shellfish or oysters.

It is known to use such systems with piezoelectric loudspeakers that can reach powers that are considerable and that can thus have effective ranges that are sufficient for the intended application. Nevertheless, piezoelectric loudspeakers are very expensive and present a frequency band that is restricted, being very difficult to extend below 100 hertz (Hz).

Other systems, such as that described in Document FR 2 586 333, function with electrodynamic loudspeakers. Nevertheless, the motors of such loudspeakers are generally contained in hermetically sealed housings that can be damaged by the pressure exerted by the immersion liquid. The emission frequency band then presents a cut-off frequency that is high. The immersion power is determined by the acceptable electrical power, which may be of the order of 100 watts (W).

Documents US2016/0094911, FR 2 523 795, and JPH0429499 describe systems comprising a body and a loudspeaker including a vibrating diaphragm. When the body is immersed, the vibrating diaphragm lies in a vertical plane.

The object of the present invention is to propose an acoustic enclosure that is robust, being suitable for being immersed in a liquid, and more particularly in water, that is of moderate cost, and that presents good performance at very low frequencies.

SUMMARY OF THE INVENTION

This object is achieved with a sound emitter device that is immersible or semi-immersible in an ambient liquid. The device comprises both a rigid hollow body having at least one opening one of its ends and arranged to be at least partially immersed in the liquid in such a manner that the main axis passing through the opening of the hollow body is substantially vertical, and also at least one electrodynamic loudspeaker comprising at least one diaphragm, at least one magnet, and at least one moving coil. The at least one loudspeaker is fastened inside the hollow body in the proximity of at least one immersed opening of the hollow body, the device and its hollow body being arranged so that, when the device is at least semi-immersed, the diaphragm of the at least one loudspeaker is in contact with the liquid on at least one of its sides and closes the immersed opening of the hollow body.

Preferably, the ambient liquid has specific gravity greater than or equal to 0.9, and more preferably greater than or equal to 0.95, and/or less than or equal to 1.2, and more preferably less than or equal to 1.05 at 20° C. at the interface with air at a pressure of 1013.25 hectopascals (hPa) at 15° C.

In nonlimiting manner, the liquid may be water, for example.

Advantageously, the device of the invention is semi-immersible or immersible in water.

In embodiments, the loudspeaker including the moving coil and the magnet are fully immersed in the ambient liquid.

Advantageously, the hollow body may be semi-immersed.

In embodiments, the device further comprises a floating part arranged at the outside of the hollow body.

In advantageous manner, the floating part is a circular body surrounding the hollow body, the circular body being made of a buoyant material.

In embodiments, the loudspeaker is fastened inside the hollow body in the proximity of the top opening, and when the device is fully immersed in the liquid, air is contained inside the hollow body.

Preferably, the coil of the loudspeaker is arranged in a protection chamber, the protection chamber being formed by a flexible membrane, and by a wall of the hollow body.

In embodiments, the device includes two loudspeakers arranged on the main axis of the hollow body and forming a chamber with their diaphragms and with the wall of the hollow chamber, the chamber being filled with a pressure compensation fluid.

In embodiments, one of the loudspeakers may be an active loudspeaker comprising a diaphragm and a coil, and the other loudspeaker may be a passive loudspeaker comprising only a diaphragm.

Preferably, the emission frequency of the loudspeaker(s) lies in the range 1 hertz (Hz) to 500 Hz.

Advantageously, the acoustic pressure level of the loudspeaker(s) may be at least 160 decibels (dB) (relative to 1 micro pascal (μPa)) at a distance of 1 meter (m) from the loudspeaker.

In embodiments, the loudspeaker may have a respective motor on each side of the diaphragm.

Advantageously, the power of the loudspeaker(s) may be adapted to the pressure of the ambient liquid in which the device is immersed or semi-immersed.

DESCRIPTION OF FIGURES AND OF EMBODIMENTS

Other advantages and features of the invention appear on reading the following detailed description of non-limiting implementations and embodiments, and from the accompanying drawings.

Since the embodiments described below are not limiting in any way, it is possible in particular to consider variants of the invention that comprise only a selection of the characteristics that are described or illustrated in isolation from other characteristics that are described or illustrated (even if this selection is isolated within a sentence including those other characteristics), providing such a selection of characteristics is sufficient to impart a technical advantage or to distinguish the invention from the state of the prior art. This selection comprises at least one characteristic that is preferably functional without structural details, and/or with only some of the structural details, if those details on their own are sufficient to impart a technical advantage or to distinguish the invention from the state of the prior art.

Figure 1:
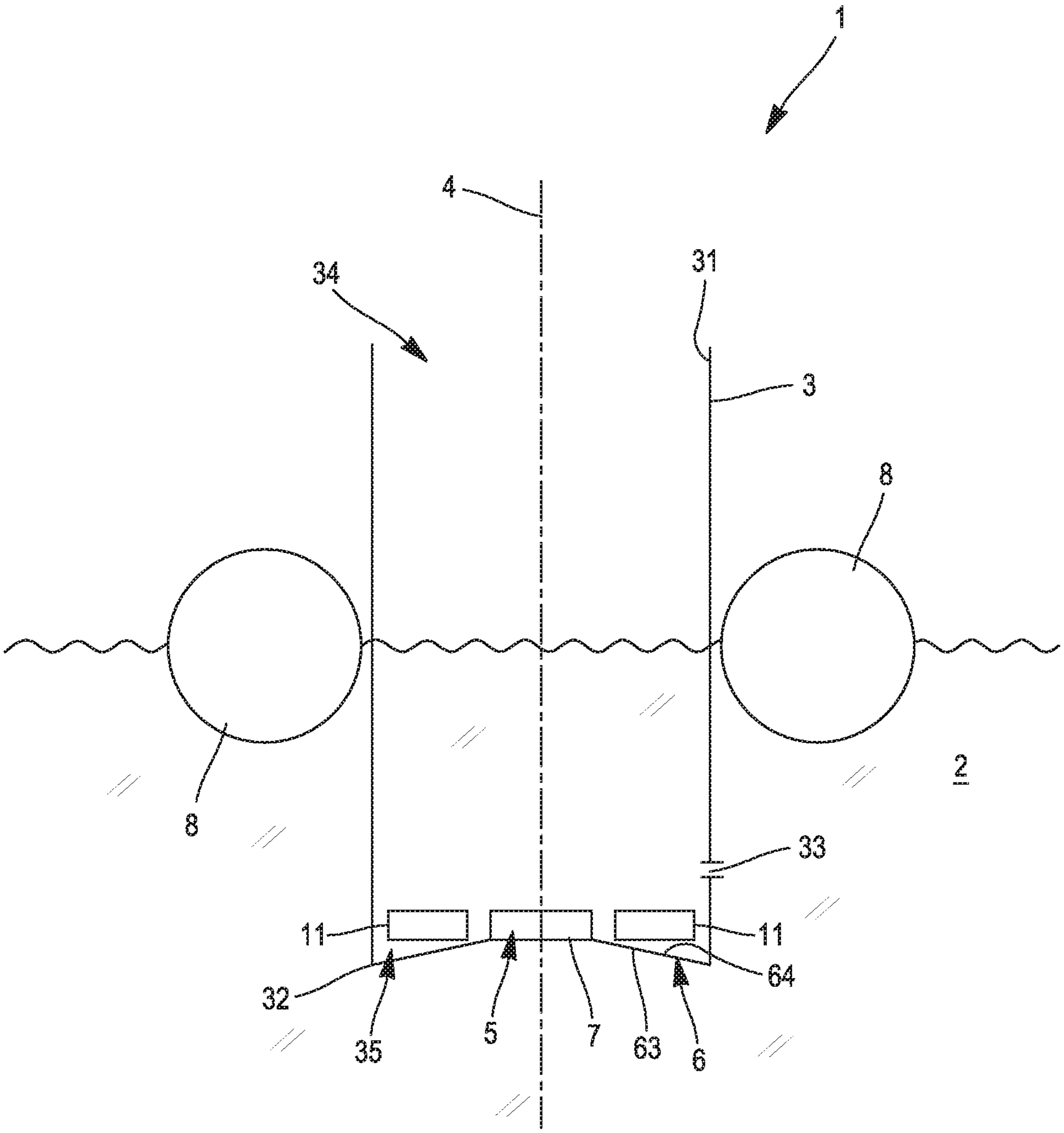
FIG. 1 is a diagrammatic view of a first embodiment of a semi-immersible sound emitter device.

With reference to FIG. 1, there follows a description of a first embodiment of a sound emitter device 1.

The sound emitter device 1 is immersible or semi-immersible in an ambient liquid. In the embodiment shown in FIG. 1, the device 1 is semi-immersed in water 2.

The device 1 comprises a floating hollow body 3 arranged to be immersed at least in part in the ambient liquid 2 at an immersible end 32 of the body 3. When the device 1 is plunged in water, the device 1 spontaneously orients itself so that the main axis 4 of the body 3 is substantially vertical. For this purpose, the device 1 is configured in such a manner that the center of gravity of the device 1 and its center of buoyancy thrust lie on the main axis 4. In the stable equilibrium position, the center of buoyancy thrust lies vertically in register with the center of gravity (i.e. above it and on the same vertical axis). The hollow body 3 has two openings 34 and 35, one at each end 31 and 32. The main axis 4 of the body 3 passes through the centers of these openings.

The hollow body 3 is made of rigid material, and preferably of metal, e.g. stainless steel. The hollow body 3 contains a volume that may be of various different shapes, e.g. a cylinder, a rectangular parallelepiped, etc. Preferably and in nonlimiting manner, the hollow body 3 is a tube, i.e. a cylinder that is hollow and rigid.

The tube 3 used in the example of FIG. 1 has an orifice 33 in the immersible portion of the tube 3. This orifice 33 enables the liquid levels inside and outside the immersed portion of the tube 3 to be balanced when the tube 3 is semi-immersed.

The device 1 also comprises at least one electrodynamic loudspeaker 5. The electrodynamic loudspeaker 5 comprises a diaphragm 6, a moving coil 7, and a magnet 11, i.e. an electrodynamic motor. The magnet 11 is mounted to be stationary relative to the hollow body 3. The coil 7 is mounted to be movable relative to the hollow body 3. More precisely, the coil 7 is suitable for moving axially relative to the hollow body 3 parallel to the main axis 4. When the loudspeaker 5 is in operation, the coil 7 passes an electric current and it tends to move relative to the hollow body 3 along the main axis 4. The movement of the coil 7 depends on the magnitude of the current passing through the coil 7. Movement of the coil 7 drives accompanying movement of the diaphragm 6.

The loudspeaker 5 is fastened inside the tube 3 in the proximity of the end 32 of the immersible opening 35 of the tube 3. The loudspeaker 5 and its moving coil 7 are fully immersed in the liquid 2, and the diaphragm 6 closes the opening 35 of the tube 3 when the device 1 is immersed or semi-immersed. In the embodiment shown in FIG. 1, this is the opening 35 that is situated at the bottom end 32. Both opposite faces 63 and 64 of the diaphragm 6 are in contact with the ambient liquid 2. In this example, the edge of the diaphragm 6 and the bottom edge of the tube 3 are flush. This arrangement of the loudspeaker 5 relative to the tube 3 allows sound to be emitted into the water without the edge of the tube 3 constituting an obstacle to the propagation of the sound waves generated by the movement of the diaphragm 6. The diaphragm 6 is fastened to the edge of the tube 3 by conventional means, e.g. by using a flange.

The diaphragm 6 of the loudspeaker 5 may equally well be arranged inside the tube 3, in the proximity of its bottom edge.

The material of the diaphragm 6 must be rigid in order to avoid any deformation of the diaphragm. Such deformation would lead to a significant drop in the performance of the loudspeaker due to destructive interference between pressure waves coming from different regions of the diaphragm. The diaphragm may be made of composite material, e.g. of the sandwich type. The diaphragm may equally well be made of aluminum, titanium, steel, honeycomb material, or even plastics material, or any other material that is suitable for this use.

In order to float in the liquid 2 in semi-immersed manner, the device 1 preferably includes a floating part 8 for preventing the body 3 from sinking fully into the liquid 2. The floating part 8 is fastened to the body 3. The floating part 8 may be in the form of a circular body pierced at its center in order to receive the hollow body 3 of the device 1 therein, as shown in FIG. 1. By way of example, the floating part 8 may be made of wood or any other material that floats in the liquid 2. The floating part 8 may be fastened around the body 3 in full or in part so that when the device 1 is semi-immersed in the liquid, the loudspeaker 5 and its moving coil 7 are fully immersed in the liquid.

Any mechanism or apparatus adapted to enable the device to float in the liquid may be used. In particular, it is possible to use a float.

Figure 2:
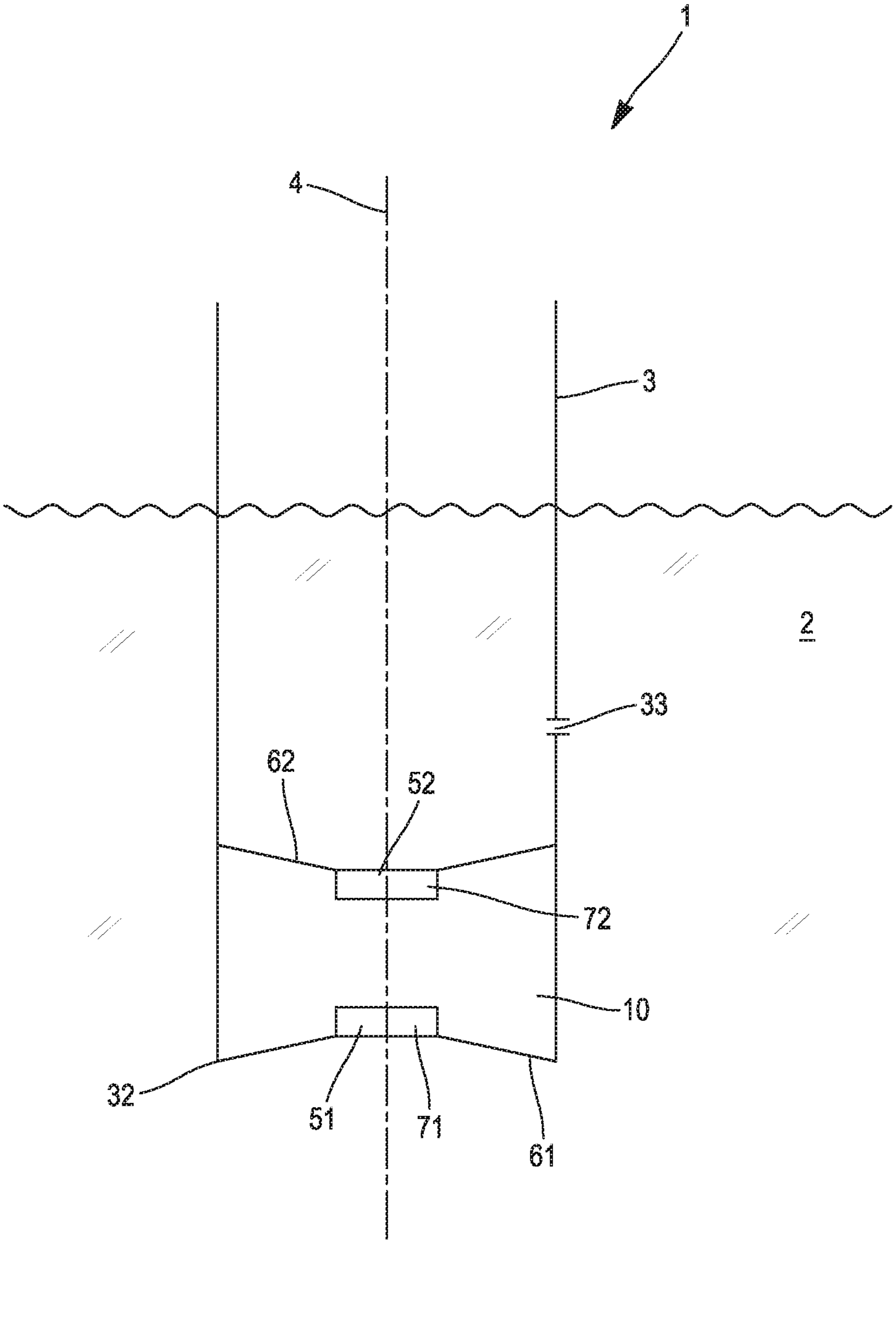
FIG. 2 is a diagrammatic view of a second embodiment of a semi-immersible sound emitter device.

FIG. 2 shows in diagrammatic manner a second embodiment of the device 1. Portions that are identical to the embodiment of FIG. 1 are not described again.

In this second embodiment, the device 1 comprises two loudspeakers 51 and 52 arranged on the axis 4 of the tube 3. The first loudspeaker 51 comprises a first diaphragm 61 and a first coil 71. The second loudspeaker 52 comprises a second diaphragm 62 and a second coil 72. Together with the wall of the tube 3, the two diaphragms 61 and 62 define a closed chamber 10. The coils 71 and 72 are inside the chamber 10. The chamber 10 formed in this way is filled with a pressure-compensation fluid. By way of example, this compensation fluid may be pressurized air or sterilized water. The pressure inside the chamber 10 is substantially the same as the pressure outside the tube 3 at the level of the loudspeakers 51 and 52; it is adjusted by connected vessels as a function of the immersion depth of the tube 3.

In advantageous manner, since the coils 71 and 72 are inside the sealed and sterile chamber 10, and the second embodiment serves to protect the coils from any pollution or dirtying. Consequently, such a device 1 is easier to maintain and its lifetime is lengthened, in particular in untreated water.

In the example shown in FIG. 2, both of the loudspeakers 51 and 52 are active loudspeakers, i.e. loudspeakers each of which comprises a diaphragm 61, 62 and an electrodynamic motor including a coil 71, 72 as defined above. The forces from the two loudspeakers add together. Thus, by way of example, it is possible to use two loudspeakers of moderate force (e.g. up to 200 newtons (N) each), which are easier and less expensive to manufacture than a single loudspeaker that is very powerful (e.g. 400 N).

In a variant, it is possible for only one of the loudspeakers 51, 52 to be an active loudspeaker. The other one of the loudspeakers 51, 52 can be a passive loudspeaker, i.e. comprising the diaphragm only. Such an arrangement has the advantage of being particularly inexpensive, while having the advantages of the device of the second embodiment.

Advantageously, the way the loudspeaker(s) is/are arranged in the device 1 of the embodiments described with reference to FIGS. 1 and 2 enables the sound wave from the front of the loudspeaker 5 to be decoupled effectively from the sound wave from its rear, by making use of the differences of characteristic impedance between air and the ambient liquid, and without impeding movement of the diaphragm. Consequently, it is possible to emit frequencies that are very low.

FIGS. 3A to 3D show in diagrammatic manner other embodiments of the device 1 in which the device 1 is fully immersible in a liquid. Portions that are identical to the embodiments of FIGS. 1 and 2 are not described again.

In these embodiments, when the device 1 is plunged in the ambient liquid 2, the device 1 spontaneously takes up an orientation such that the main axis 4 of the hollow body 3 is vertical with the loudspeaker 5 being placed at the top of the hollow body 3. The device 1 is immersed in the liquid 2 in such a manner that the air contained inside the hollow body 3 becomes compressed to the pressure of the ambient liquid 2 surrounding the device 1. Thus, the diaphragm 6 of the loudspeaker 5 is exposed to equal pressures on both sides of the diaphragm 6, which then remains in a neutral position. One of the faces of the diaphragm 6 is in contact with the ambient liquid, and the other face of the diaphragm 6 is in contact with the air contained in the hollow body 3. The difference in characteristic impedance between the ambient liquid and air prevents phase opposition when the diaphragm 6 is moved by the coil 7.

Figure 3A:
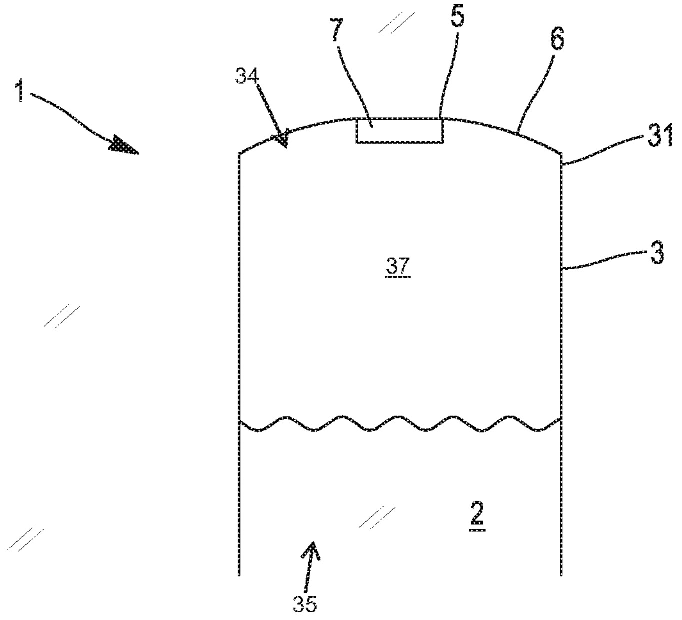
FIGS. 3A to 3D are diagrammatic views of embodiments of sound emitter devices that are fully immersible.
Figure 3B:
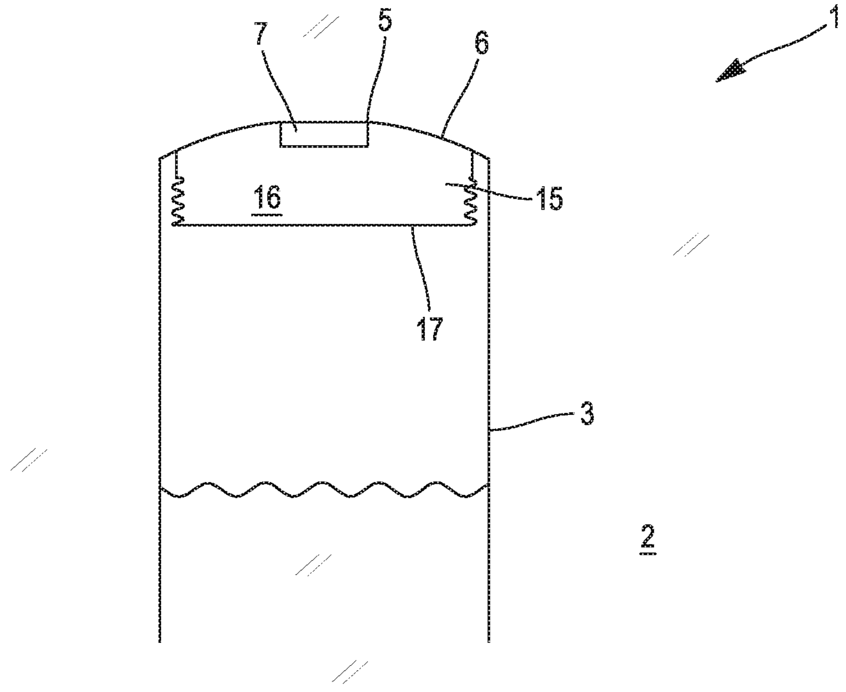

In the example of FIG. 3A, the coil 7 of the loudspeaker 5 is inside the device 1. The example of FIG. 3B is a variant of the example of FIG. 3A, in which the motor 7 of the loudspeaker 5 is surrounded by a cooling liquid 16 contained in a flexible and stretchable pouch 17. In the example shown, the flexible pouch 17 is a bladder with a concertina deformation mechanism. The flexible pouch 17 forms a protection chamber 15 around the coil 7 and allows the moving parts of the loudspeaker 5 to move, the cooling liquid 16 being incompressible.

Figure 3C:
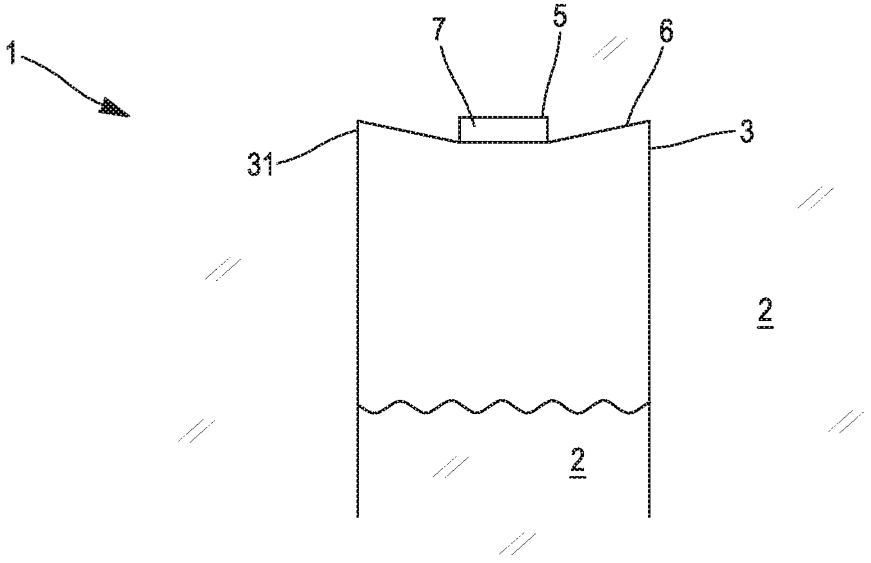
Figure 3D:
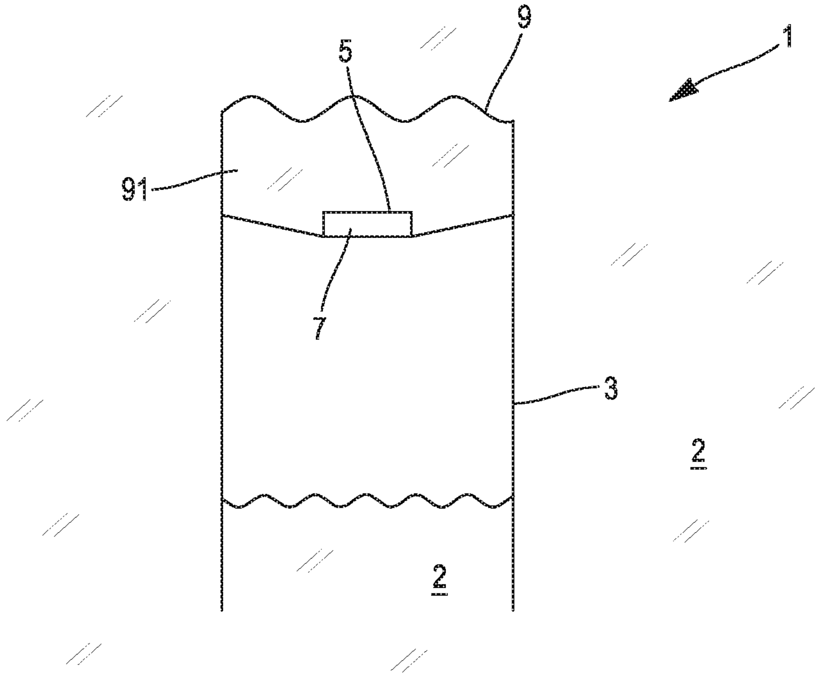

In the example of FIG. 3C, the coil 7 of the loudspeaker 5 is outside the device 1. More precisely, the coil 7 is fastened to the face of the diaphragm 6 that is in contact with the ambient liquid 2. The example of FIG. 3D is a variant of the example of FIG. 3C, in which the loudspeaker 5 is not flush with the edge of the body 3, but is set back a little therein. The top end 31 of the body 3 is closed by a flexible membrane 9. By way of example, this membrane 9 may be made of polyester, such as the substance Mylar® sold by the supplier DuPont. The protection chamber 91 formed in this way between the flexible membrane 9 and the loudspeaker contains a sterile cooling liquid, e.g. distilled water. The coil 7 is then simultaneously protected from potential contamination and also cooled.

The device in the example of FIG. 3C is preferably usable in a liquid that is sterile (e.g. chlorinated water) in order to avoid micro-organic contamination of the coil 5.

In the embodiments shown in FIGS. 3A to 3D, the device does not include a pressure balancing pouch. The fluid contained in the cavity 37 of the hollow body 3 (e.g. air) is in contact with the ambient liquid 2 (e.g. water), with an air/water interface being formed inside the body 37 of the hollow body 3. The air is held captive inside the cavity 37. The quantity of air contained in the cavity 37 remains constant.

When the pressure of the ambient liquid 2 increases, ambient liquid 2 (i.e. water) penetrates into the inside of the cavity 37 of the hollow body 3 via the second opening 35 (bottom opening) of the hollow body 3. In this way, the fluid contained inside the cavity 37 (i.e. air) is compressed until it reaches a pressure equal to the pressure of the ambient liquid 2.

Conversely, when the pressure of the ambient liquid 2 decreases, liquid contained inside the hollow body 3 is discharged to the outside of the device 1 via the second opening 35 (bottom opening) of the hollow body. In this way, the fluid contained inside the cavity 37 expands until it reaches a pressure equal to the pressure of the ambient liquid 2.

In other words, the ambient liquid 2 flowing through the second opening of the hollow body 3 has the effect of moving the air/water interface inside the cavity 37. In this way, both faces of the diaphragm 6 of the loudspeaker 5 are subjected continuously to pressures that are identical. Pressure balancing takes place in a manner that is natural, in a sense that there is no need for any device for injecting fluid.

Figure 4:
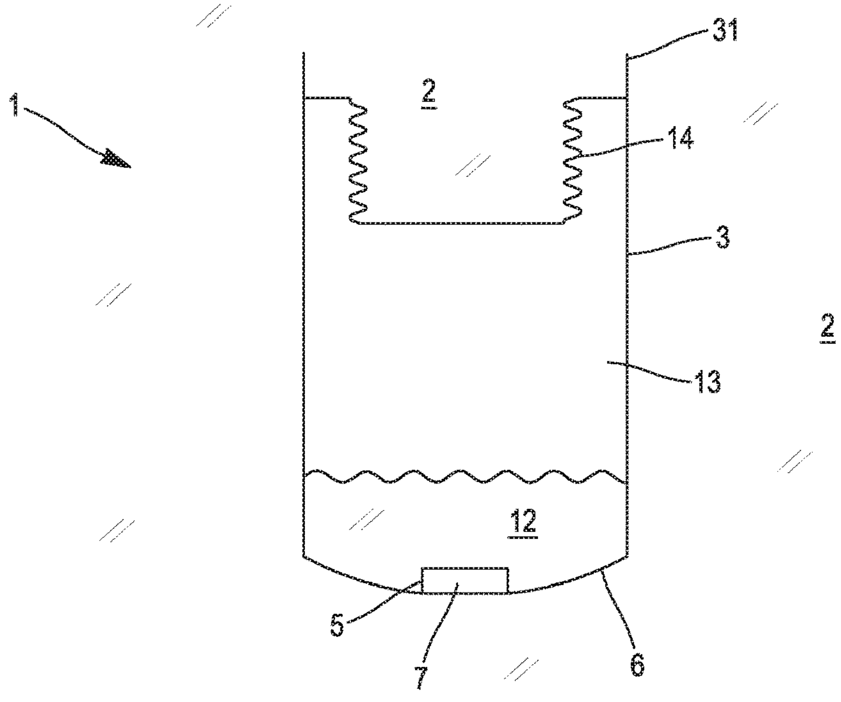
FIGS. 4 and 5 are diagrammatic views of other embodiments of sound emitter devices that are fully immersible.
Figure 5:
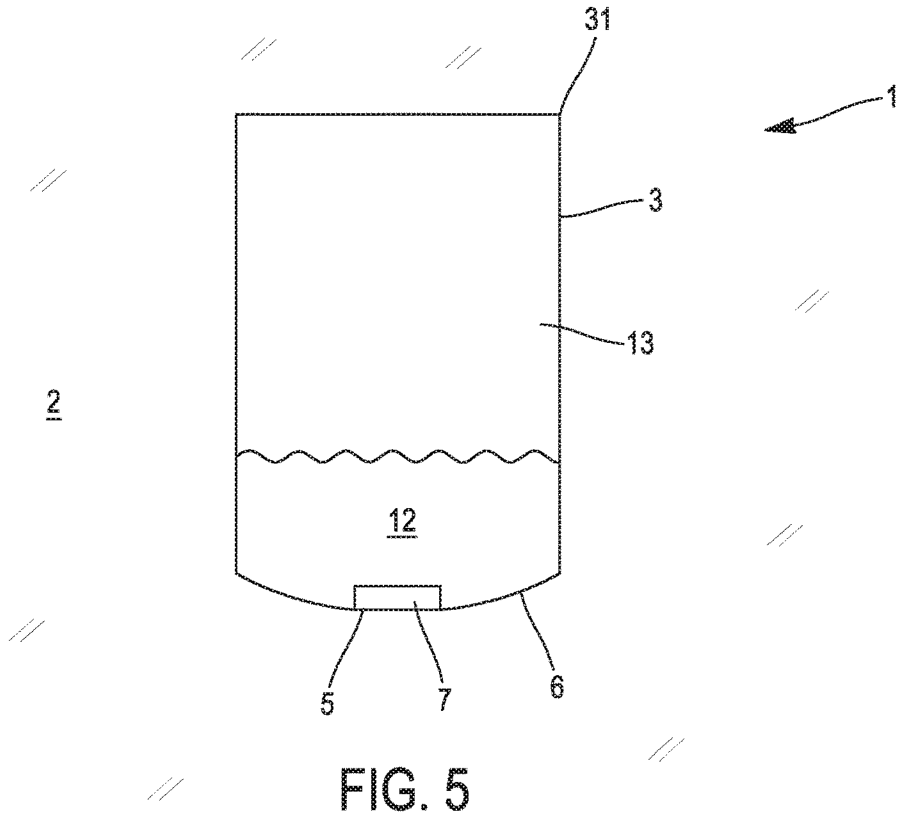

In the embodiments of FIGS. 4 and 5, when the device 1 is plunged in the ambient liquid 2, the device 1 spontaneously takes up an orientation such that the main axis 4 of the hollow body 3 is vertical and the loudspeaker 5 is located at the bottom of the hollow body 3 of the device 1. Portions that are identical to the embodiments of the preceding figures are not described again.

At its top end 31, the hollow body 3 is closed by a deformable part 14. In the example shown, the deformable part is a bladder 14 with a concertina deformation mechanism. The deformable part 14 could equally well be a flexible and stretchable membrane. The protection chamber 13 formed inside the hollow body 3 between the bladder 14 and the loudspeaker 5 is filled with air. Advantageously, the chamber 13 could equally well contain a sterile cooling liquid 12. Under such circumstances, both opposite faces of the diaphragm 6 are in contact with liquid. When the device 1 is immersed in the ambient liquid 2, the bladder 14 deforms as a function of the pressure of the liquid, thereby compressing the air inside the chamber 13. The loudspeaker 5 is then exposed to equal pressures on both sides of the diaphragm 6.

This embodiment allows the depth of immersion to be varied considerably, while conserving equal pressures on both sides of the diaphragm 6 and thus conserving good performance of the device 1.

With reference to FIG. 5, unlike the embodiment of FIG. 4, the hollow body 3 of the device 1 in this embodiment is closed at its top end 31 by a wall that is rigid (e.g. being of the same type as the side wall of the hollow body 3). The protection chamber 13 formed inside the hollow body 3 is filled with air. Advantageously, the chamber 13 also contains a sterile cooling liquid 12. The quantity of this liquid 12 is determined by the depth of immersion of the device 1, with the depth of immersion being predetermined and relatively shallow in this embodiment. Both opposite faces of the diaphragm 6 are in contact with liquid.

The device 1 of the embodiments of FIGS. 3A to 3D, 4, and 5 presents the advantage of being easy to manufacture and of being inexpensive. It is suitable for being used at different depths of total immersion, since the way it is arranged reduces stresses on the diaphragm. Advantageously, its efficiency is very high.

Figure 6:
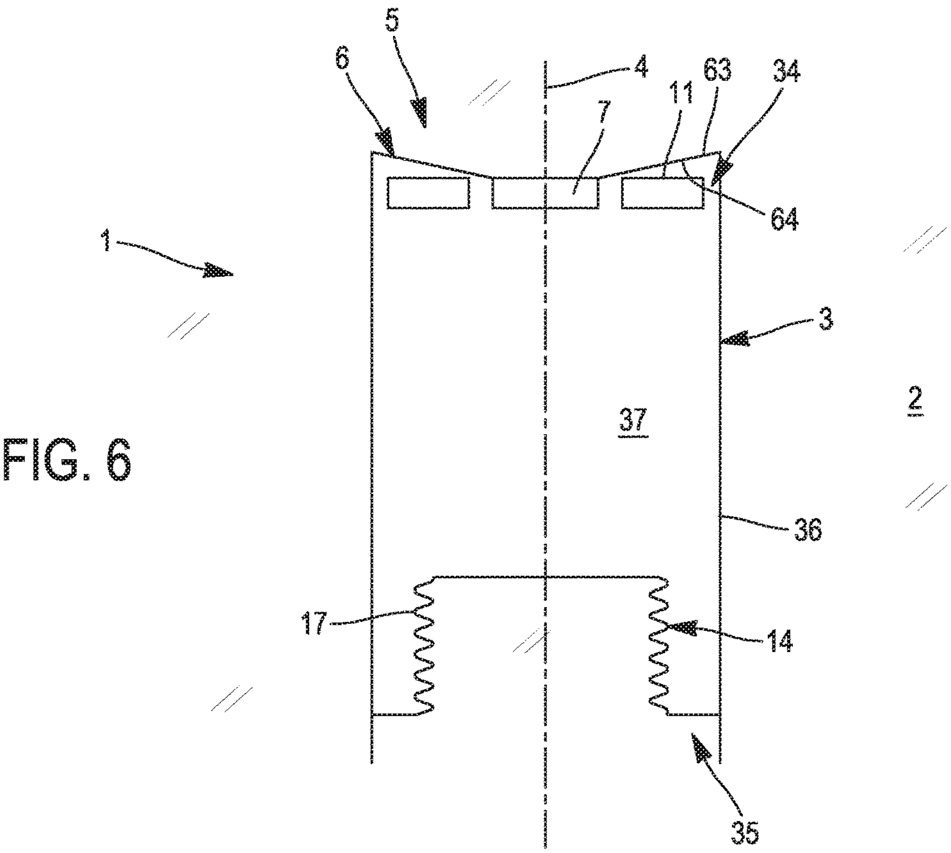
FIG. 6 is a diagrammatic view of another embodiment of a sound emitter device.

FIG. 6 is a diagrammatic view of another embodiment of a sound emitter device 1.

In this embodiment, the sound emitter device 1 comprises a hollow body 3, a loudspeaker 5, and a pressure balancing pouch 14.

The hollow body 3 comprises a side wall 36, e.g. a side wall 36 of cylindrical shape, defining an inside cavity 37. The inside cavity 37 is filled with a fluid such as air or water.

The hollow body 3 presents a main axis 4. In the example shown in FIG. 6, the side wall 36 is circularly cylindrical in shape, and the main axis 4 is the axis of symmetry of the side wall 36. The hollow body 3 has a first opening 34 (or top opening) and a second opening 35 (or bottom opening). The first opening 34 is circular in shape. The second opening 35 is also circular in shape. The main axis 4 passes through the center of the first opening 34. The main axis 4 also passes through the center of the second opening 35.

The loudspeaker 5 is arranged inside the hollow body 3. The loudspeaker 5 comprises a diaphragm 6, a moving coil 7, and a magnet 11. The diaphragm 6 is fastened to the hollow body 3 so as to close the second opening 34. The diaphragm 6 is axisymmetric in shape about the main axis 4. The diaphragm 6 presents a first face 63 and a second face 64 that is opposite from the first face 63. The first face 63 is in contact with the ambient liquid 2, while the second face 64 of the diaphragm 6 is in contact with the fluid contained in the inside cavity 37 of the hollow body 3. The magnet 11 is mounted to be stationary relative to the hollow body 3. The coil 7 is mounted to be movable relative to the hollow body 3. More precisely, the coil 7 is suitable for moving axially relative to the hollow body 3 parallel to the main axis 4. When the loudspeaker 5 is in operation, the coil 7 passes an electric current and tends to move relative to the hollow body 3 along the main axis 4. The movement of the coil 7 depends on the magnitude of the current passing through the coil 7. Movement of the coil 7 drives accompanying movement of the diaphragm 6.

In the embodiment shown in FIG. 6, the pressure balancing pouch 14 is situated inside the hollow body 3. The pressure balancing pouch 14 comprises a flexible membrane 17 suitable for containing a pressure compensation fluid. In the embodiment shown in FIG. 6, the pressure compensation fluid is a liquid identical to the ambient liquid 2. The pressure balancing pouch 14 closes the second opening 35. In this way, the quantity of fluid contained in the cavity 37 of the hollow body 3 is constant.

The flexible membrane 17 forming the pressure balancing pouch 14 is suitable for deforming under the effect of a variation of pressure in the ambient liquid 2. More precisely, when the pressure of the ambient liquid 2 increases, the volume of the pouch 14 increases and the pouch 14 fills with liquid. Ambient liquid penetrates into the pouch 14 via the second opening 35. In this way, the fluid contained inside the cavity 37 is compressed until it reaches a pressure equal to the pressure of the ambient liquid 2.

Conversely, when the pressure of the ambient liquid 2 decreases, the volume of the pouch 14 decreases and the pouch 14 empties. The liquid contained in the pouch 14 is discharged to the outside of the device 1. In this way, the fluid contained inside the cavity 37 expands until it reaches a pressure equal to the pressure of the ambient liquid 2.

In other words, deformation of the flexible membrane of 17 causes the pressure compensation fluid to flow through the second opening 35 so that both faces 63 and 64 of the diaphragm 6 of the loudspeaker 5 are subjected continuously to pressures that are identical. Pressure balancing takes place in a manner that is natural, in a sense that there is no need for any device for injecting compensation fluid.

When the device 1 is plunged in the ambient liquid 2, the device 1 spontaneously orients itself in a position of stable equilibrium. In the stable equilibrium position, the main axis 4 is vertical and the first opening 34 is situated above the second opening 35.

This orientation presents the advantage that the diaphragm 6 of the loudspeaker 5 is subjected to the same hydrostatic pressure in axisymmetric manner around the main axis 4.

Figure 7:
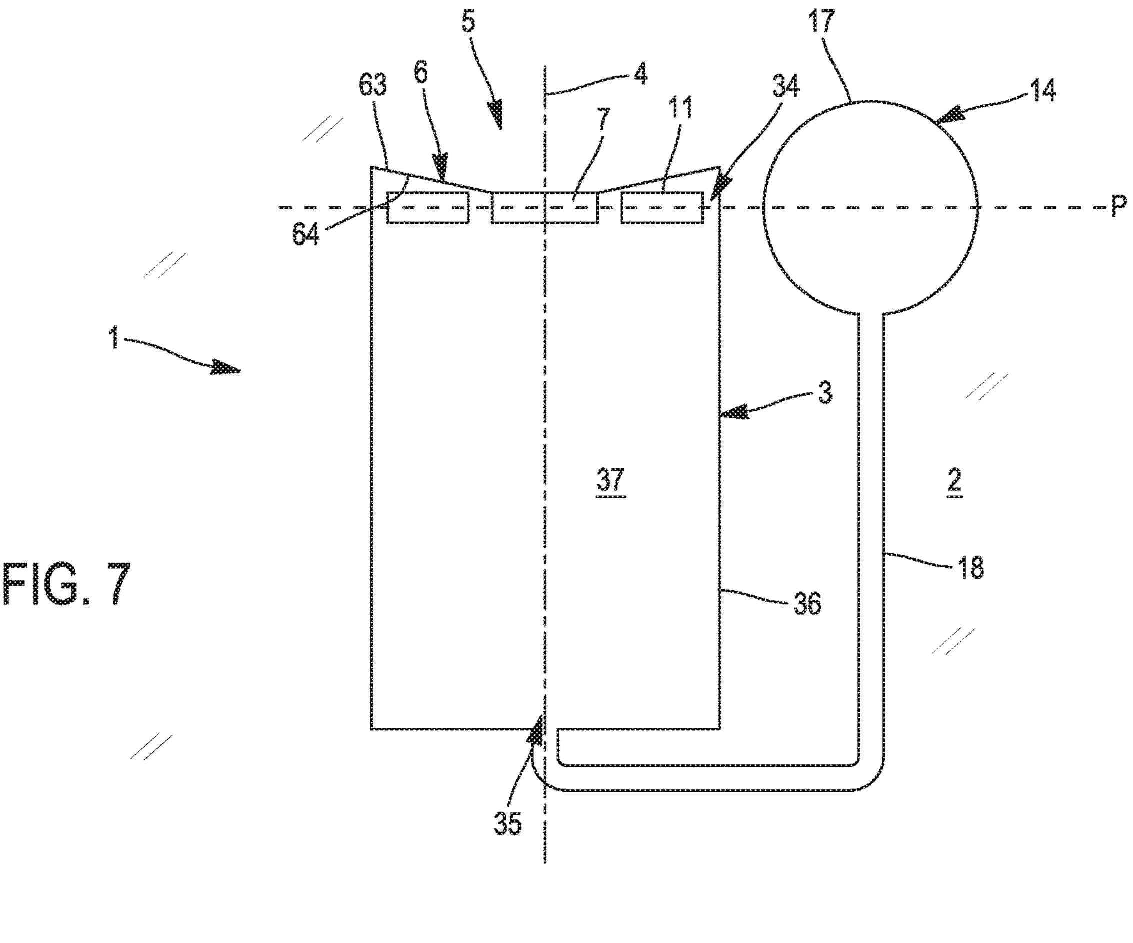
FIG. 7 is a diagrammatic view of another embodiment of a sound emitter device.

FIG. 7 is a diagrammatic view of another embodiment of a sound emitter device 1.

As in the embodiment of FIG. 6, the sound emitter device 1 comprises a hollow body 3, a loudspeaker 5, and a pressure balancing pouch 14.

A hollow body 3 and the loudspeaker 5 are identical to the hollow body 3 of the embodiment of FIG. 6.

In contrast, in the embodiment shown in FIG. 7, the pressure balancing pouch 14 is situated outside the hollow body 3. The pressure balancing pouch 14 comprises a flexible membrane 17 suitable for containing a pressure compensation fluid. The device 1 further comprises a fluid flow duct 18 connecting the pressure balancing pouch 14 to the second opening 35. In the embodiment shown in FIG. 7, the pressure compensation fluid is a fluid identical to the fluid contained in the cavity 17 of the hollow body 3, i.e. air or water. Thus, the total quantity of fluid contained both in the cavity 17 of the hollow body 3 and also in the pressure balancing pouch 14 is constant.

In the example shown in FIG. 7, the pressure balancing pouch 14 is arranged relative to the hollow body 3 in such a manner as to be situated in the ambient liquid 2, substantially at the same depth P as the diaphragm 6 of the loudspeaker 5. This arrangement serves to ensure that the pressures acting on the two faces 63 and 64 of the diaphragm 6 are balanced.

The flexible membrane 17 forming the pressure balancing pouch 14 is suitable for deforming under the effect of a variation of pressure in the ambient liquid 2. More precisely, when the pressure of the ambient liquid 2 increases, the volume of the pouch 14 decreases and the pouch 14 empties out the fluid that it contains. The fluid flows from the pressure balancing pouch 14 via the flow duct 18 to the cavity 37 of the hollow body 3, and it penetrates into the inside of the cavity 37 of the hollow body 3 via the second opening 35. In this way, the fluid contained inside the cavity 37 is compressed until it reaches a pressure against the face 64 of the diaphragm 6 that is equal to the pressure of the ambient liquid 2 acting on the face 63 of the diaphragm 6.

Conversely, when the pressure of the ambient liquid 2 decreases, the volume of the pouch 14 increases and the pressure balancing pouch 14 fills with fluid. Fluid discharged from the cavity 37 is guided to the pressure balancing pouch 14 via the second opening 35 and the flow duct 18. In this way, the fluid contained inside the cavity 37 expands until it reaches a pressure against the face 64 of the diaphragm 6 that is equal to the pressure of the ambient liquid 2 acting on the face 63 of the diaphragm 6.

In other words, deformation of the flexible membrane of 17 causes the pressure compensation fluid to flow through the second opening 35 so that both faces 63 and 64 of the diaphragm 6 of the loudspeaker 5 are subjected continuously to pressures that are identical. Pressure balancing takes place in a manner that is natural, in a sense that there is no need for any device for injecting compensation fluid.

When the device 1 is plunged in the ambient liquid 2, the device 1 spontaneously becomes oriented so that the main axis 4 is vertical and the first opening 34 is situated above the second opening 35.

This orientation presents the advantage that the diaphragm of the loudspeaker is subjected to the same hydrostatic pressure in axisymmetric manner around the main axis 4.

In particularly advantageous manner, immersing the loudspeaker 5 in a liquid has the advantage of enabling the electrodynamic motor of the loudspeaker to be cool very efficiently by the liquid surrounding the motor. Thus, there is no need to provide the device 1 with an additional cooling system or circuit. Consequently, it is possible to obtain emission powers that are much greater than can be obtained from loudspeakers that are not cooled by liquid. Cooling is also obtained when the motor is surrounded by air, but nevertheless to a smaller extent.

In preferred embodiments, the device 1 of the invention is semi-immersible in seawater. When semi-immersed, the device 1 can then advantageously be used for keeping off predator fish. For this application, the emission frequency band should lie in the range approximately 40 Hz to 500 Hz. Electrodynamic loudspeakers are perfectly capable of reaching these frequency bands.

For example, the device 1 may be used to keep gilt-head sea bream away from shellfish beds in order to avoid the bream predating farmed mussels or oysters. The sound emitted by the device 1 then scares off the predator fish without harming them physically. For example, a loudspeaker delivering an acoustic pressure level in water that is greater than 160 dB at 1 m (relative to 1 μPa) can be effective in keeping off predator fish. Such a device 1 may have a range of about 300 m.

In order to provide a shellfish bed with effective protection, a plurality of devices 1 of the invention may be arranged either immersed or semi-immersed and spaced apart in such a manner that the entire bed is covered by sound emissions at the required level while the devices are in operation.

Another possible application of the device of the invention is emitting agreeable sounds into swimming or recreational pools.

Depending on the depth of immersion of the loudspeaker in the liquid, the power of the loudspeaker needs to be adapted in order to compensate for loss of radiation with variation in the pressure of the liquid.

In an embodiment that is not shown, the loudspeaker of the device could equally well include respective electrodynamic motors on both sides of the diaphragm. Such an arrangement makes it possible to double the force factor while using only one loudspeaker.

Naturally, the invention is not limited to the examples described above, and numerous adaptations may be applied to those examples without going beyond the ambit of the invention.

Naturally, the various characteristics, shapes, variants, and embodiments of the invention can be associated with one another in various combinations in so far as they are not incompatible or mutually exclusive. In particular, all of the above-described variants and embodiments can be combined with one another.

The invention claimed is:

1. A sound emitter device that is immersible or semi-immersible in an ambient liquid, the device being characterized in that it comprises:

a rigid hollow body having a first opening and a second opening, the hollow body being arranged to be immersed at least in part in the ambient liquid and having a main axis passing through the first opening of the hollow body;

an electrodynamic loudspeaker comprising a diaphragm closing the first opening, a magnet that is mounted stationary relative to the hollow body, and a coil that is mounted to be movable relative to the hollow body along a travel direction parallel to the main axis of the hollow body; and a pressure balancing pouch comprising a flexible membrane and suitable for containing a pressure compensation fluid, the flexible membrane being suitable for deforming under the effect of a variation in the pressure of the ambient liquid, the deformation of the flexible membrane giving rise to a flow of pressure compensation fluid through the second opening in such a manner as to balance the pressures exerted on either side of the diaphragm of the loudspeaker;

wherein the device and its hollow body are arranged in such a manner that, when the device is at least semi-immersed in the ambient liquid, the device spontaneously takes up orientation with the main axis of the hollow body extending vertically and with a face of the diaphragm of the loudspeaker being in contact with the ambient liquid.

2. A device according to claim 1, wherein the hollow body defines an internal cavity, and the pressure balancing pouch extends inside the internal cavity.

3. A device according to claim 2, wherein the inside of the pressure balancing pouch is in communication with the ambient liquid via the second opening in such a manner that the ambient liquid forms the compensation fluid.

4. A device according to claim 1, wherein the hollow body defines an internal cavity, and the pressure balancing pouch extends outside the internal cavity.

5. A device according to claim 4, including a fluid flow duct connecting the pressure balancing pouch the second opening.

6. A device according to claim 4, wherein the pressure balancing pouch is arranged relative to the hollow body in such a manner that, when the device is at least semi-immersed in the ambient liquid with the main axis vertical, the balancing pouch is positioned at a depth substantially identical to the depth of the diaphragm of the loudspeaker.

7. A device according to claim 1, wherein the device spontaneously takes up an orientation such that the hollow body is semi-immersed in the ambient liquid.

8. A device according to claim 1, further comprising a floating part arranged outside the hollow body and fastened to the hollow body.

9. A device according to claim 1, wherein the device and its hollow body are arranged in such a manner that, when the device is at least semi-immersed in the ambient liquid, the device spontaneously takes up an orientation with the main axis of the hollow body extending vertically and with the first opening being situated above the second opening.

10. A device according to claim 1, wherein the coil of the loudspeaker is arranged in a protection chamber, the protection chamber being formed by the diaphragm of the loudspeaker, by a flexible membrane, and by a wall of the hollow body.

11. A device according to claim 1, having two loudspeakers arranged on the main axis of the hollow body and defining a chamber with their diaphragms and with a wall of the hollow body, the chamber being filled with the pressure compensation fluid.

12. A device according to claim 1, having two loudspeakers and wherein one of the loudspeakers is an active loudspeaker comprising a diaphragm and a coil, and the other loudspeaker comprises a passive diaphragm.

13. A device according to claim 1, wherein the or one of the loudspeakers is capable of delivering an acoustic pressure level of at least 160 dB at a distance of 1 m from the loudspeaker in a frequency band lying in the range 1 Hz and 500 Hz.

14. A device according to claim 1, wherein the loudspeaker or one of the loudspeakers has a respective motor on each side of the diaphragm.

* * * * *